Nov. 11, 1969    J. M. KRAFFT ET AL    3,477,285

FOUR-LOBED DIAMETRAL-STRAIN GAGE

Filed Aug. 4, 1967    3 Sheets-Sheet 1

INVENTORS
JOSEPH M. KRAFFT
FRANK W. BIRD

BY *Melvin L. Crane* AGENT

*R. S. Sciascia* ATTORNEY

Nov. 11, 1969   J. M. KRAFFT ET AL   3,477,285
FOUR-LOBED DIAMETRAL-STRAIN GAGE
Filed Aug. 4, 1967                      3 Sheets-Sheet 3

INVENTORS
JOSEPH M. KRAFFT
FRANK W. BIRD

_United States Patent Office_

3,477,285
Patented Nov. 11, 1969

3,477,285
FOUR-LOBED DIAMETRAL-STRAIN GAGE
Joseph M. Krafft, 1709 Oakcrest Drive, Alexandria, Va. 22302, and Frank W. Bird, 7204 Alger Road, Falls Church, Va. 22042
Filed Aug. 4, 1967, Ser. No. 658,987
Int. Cl. G01n 3/00, 3/08; G01b 7/00
U.S. Cl. 73—88.5
6 Claims

ABSTRACT OF THE DISCLOSURE

This invention is directed to a strain gage base upon which suitable strain gage elements are mounted for measuring the diametral strain on a compression sample at different strain rates, and at low temperatures with high accuracy and sensitivity. The strain gage is of cruciform shape with two pairs of diametrically opposite lobes. Each lobe is provided with at least one strain gage element on the surface thereof each of which are connected electrically to form a complete Wheatstone bridge circuit. The strain gage base is placed over a cylindrical test specimen then inserted into a compression loader. A load applied to the compression specimen acts upon the strain gages on the base to determine the strain.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to strain gage devices and more particularly to a four-lobed diametral-strain gage and to the method of determining tensile instability as well as other plastic flow characteristics of a sample.

THE PRIOR ART

Heretofore mechanical properties of materials have been evaluated by tensile tests. The strain was measured longitudinally on the specimen, usually with detachable probes. In carrying out such tests the specimen may be made so long that constraint of the ends by which it was gripped had a negligible effect on the test. Compression testing is more readily adapted to high strain rate machines than tensile specimens. However, in compression testing the sample cannot be as long as tensile specimen because the specimen usually buckles or collapses. Thus, the test specimen of necessity are limited to a length of 1½ to 2 diameters, thus, there is insufficient room for a detachable longitudinal gage on the compression specimen. A source of error in such testing developes from frictional constraint on the ends which have a marked effect on the total strain measured at the deforming platens, particularly with hard metals of inherently low rates of strain hardening; that is, relatively low slopes of the stress-strain curve in plastic flow.

SUMMARY

This invention is directed to a simple strain gage which is formed from a small ring of resilient metal. The ring is formed with two pairs of diametrically opposite lobes separated by straight sections directed toward the center. At least one strain gage element is placed on each lobe and connected electrically to complete the arms of a Wheatstone bridge. A short length of sample material is placed within the strain gage and in contact with the straight sections. The sample, with the strain gage attached, is then placed within a compression loader and a compression load is applied to the sample. Expansion due to load is measured by the strain gages to provide a measure of tensile instability as well as other elastic and plastic flow characteristics revelant to the fracture performance.

STATEMENT OF THE OBJECTS

It is therefore an object of the present invention to provide a strain gage for measuring the diametral strain on a compression sample.

Another object is to provide a simple compact strain gage for use in compression testing.

Still another object is to provide a device that has a quick response, may be operated at cryogenic temperatures, and is temperature compensating.

Yet another object is to provide a strain gage which allows a simple compression test to yield data of an accuracy previous attainable only with tensile specimen.

Various other objects and features of the present invention will become readily apparent upon consideration of the following description thereof when taken in connection with the accompanying drawing, wherein:

DETAILED DESCRIPTION

Figure 1:
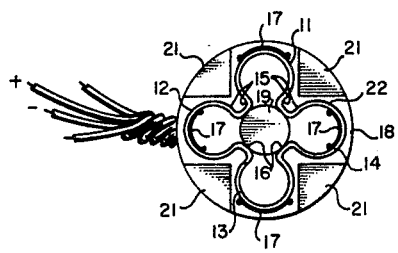
FIG. 1 illustrates an end view of a plunger anvil of a dynamic loader shown with the diametral gage of the present invention assembled ready for a compression test.
Figure 8:
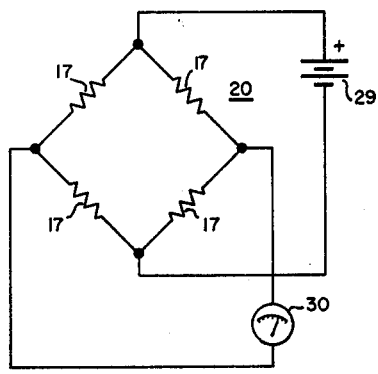
FIG. 8 illustrates a Wheatstone bridge circuit formed by the strain gage elements of the diametral strain gage shown in FIG. 1.

Now referring to the drawings, there is shown by illustration in FIG. 1 a diametral strain gage made according to the teachings of the present invention. The strain gage is made with two pair of diametrically opposite lobes 11–14 which are joined by straight surfaces 15 that extend toward the center to a straight line connection 16 between adjacent straight portions 15. The straight line connections 16 are equi-spaced from the axis of the device and are tangent to a circle about the axis coaxial therewith. Each of the four-lobes are provided with at least one electrical resistance strain gage element 17 which may be of any suitable type such as a resistance wire, foil, etc. For greater accuracy each of the lobes may be provided with a strain gage on the inner and outer surface thereof. The electrical connections are brought out through suitable passages in the plunger anvil 18 and are connected into an electrical circuit as the four arms of a Wheatstone bridge circuit 20 as shown in FIG. 8. If desired, a thermocouple may be secured within one of the throats of one of the lobes to determine the temperature of the sample. As shown in FIG. 1, the plunger anvil is provided with four pie shaped feet 21 astride the strain gage which intercepts the anvil that is forced onto the sample in a manner required for isothermal through rapid simulation of the stress strain relationship.

Figure 4:
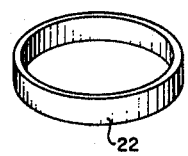
FIG. 4 is a metal ring from which the strain gage base is formed.
Figure 5:
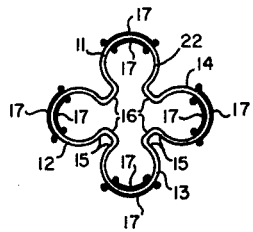
FIGS. 5, 6, and 7 illustrates separate gages that have different sized lobes and centers between the lobes which are prepared for reception of strain gage elements on the lobes thereof which FIG. 5 shown with eight strain gage elements attached.
Figure 6:
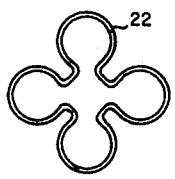
Figure 7:
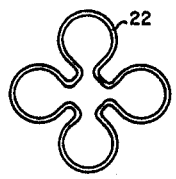

FIG. 4 illustrates a ring 22 which forms the strain gage base and which is formed into a strain gage configuration such as described above. As shown in FIGS. 5, 6, and 7, there are three formed strain gage base elements each having different size circular configurations for the lobes as well as the central area of the strain gage. FIG. 5 is shown with eight strain gage of elements secured to the surface thereof in preparation for a compression test.

Figure 2:
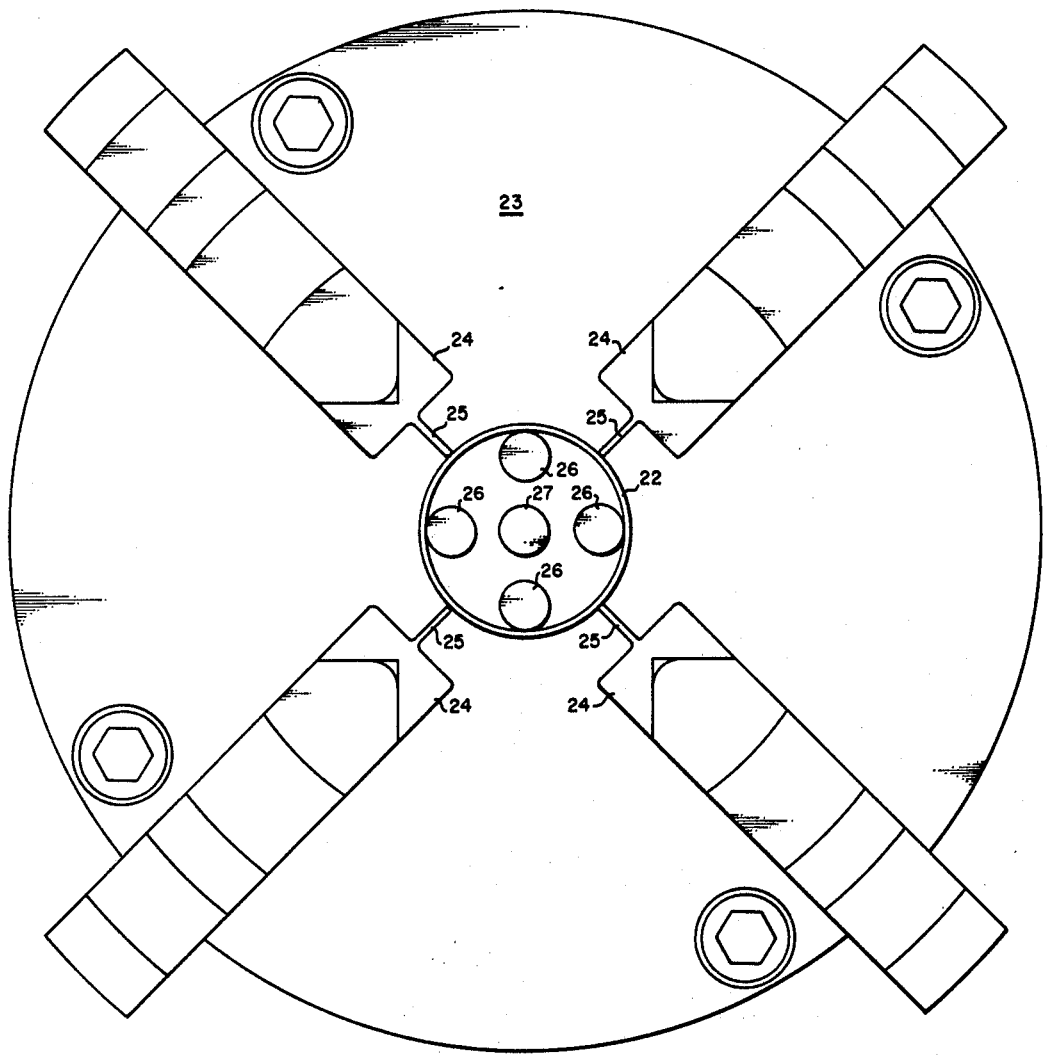
FIG. 2 illustrates a strain gage base assembled within a chuck used to form the diametral gage.
Figure 3:
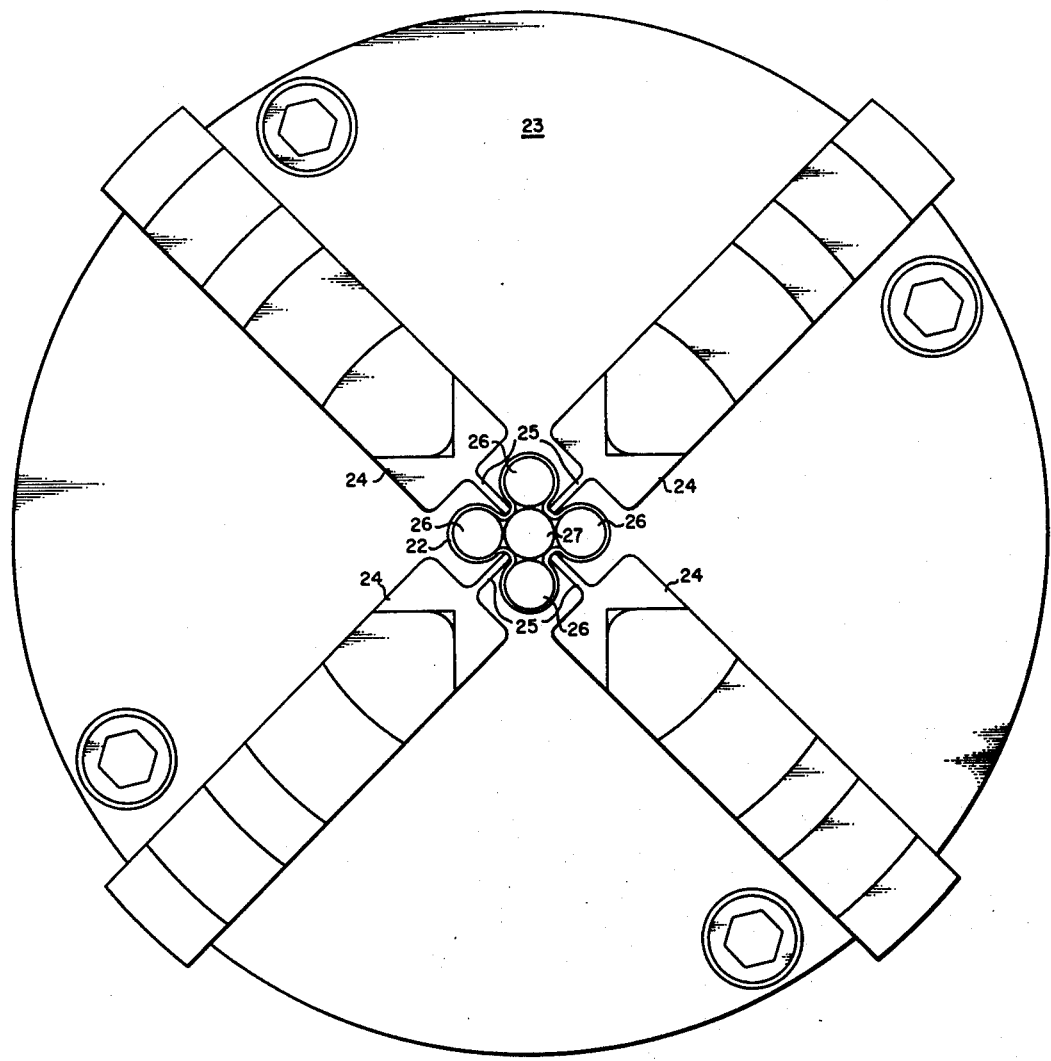
FIG. 3 illustrates the strain gage base formed by the chuck and positioned therein.

FIGS. 2 and 3 are directed to instrumentation by which the base ring may be formed into the strain gage element. As shown, the diametral gage is formed by a 4-jaw scroll chuck 23. Each of the jaws of the chuck are provided with an element 24 having elongated fingers 25 thereon which contact the ring 22. Four identical cylindrical pins 26 are placed within the ring equally disposed from the fingers extending from the chuck and a central sizing cylinder or pin 27 is placed in the center coaxial with the ring. The pins used are of a selected size which is to form the lobes of the diametral gage. The center pin is selected slightly smaller than the compression test specimen which is to be tested. The jaws of the scroll chuck are moved in their normal manner of operation simultaneously toward the center pin 27 wherein the ring is deformed about the pins 26 to form lobes with the straight sections as described above. As the jaws are brought together, the metal ring is stretched slightly over the pins into firm contact with the central sizing cylinder 27. The metal ring dimensions and the forming pins that form the radial dimensions of the gage are selected to provide a slight stretching in the forming process. Some stretching assures exact symmetry of each of the lobes. It is to be noted that too much stretching must be avoided to prevent rupture near the contact segments of the center pin.

FIG. 2 illustrates the ring, pin and chuck set up at the beginning of the formation of the diametral gage and FIG. 3 illustrates the diametral gage after having been formed by the simultaneous closing of the chucks toward the center pin. Since the strain gage is shaped from a continuous ring of resilient metal, the resilient base should be hardened by heat treatment. In case of aluminum stock, type 6061, the base after being formed is brought to a hardness of T-4 and thence to a hardness of T-6 condition. Subsequent to forming, each lobe of the hardened base is instrumented with at least one electrical resitance strain gage on each lobe, however, as explained previously, opposite pairs of strain gage elements, two inside and two outside can be wired to form four arms of a Wheatstone bridge circuit by use of eight strain gage elements.

A diametral gage formed as described above may be formed by use of a specimen blank of an annealed ring of metal such as 6061 Aluminum in zero (soft) condition. Typical dimensions of the ring are outside diameter, 1⅛ inch, wall thickness 0.020 inch for a gage containable in a one inch diameter compression subassembly. The four pins for forming the lobes are typically 0.280 to 0.320 inch outside diameter and for a ¼ inch compression test specimen the center pin is slightly less than ¼ of an inch in outside diameter. Thus, as the jaws of the chuck are brought together and the metal is stretched slightly over the pins into firm contact with the sizing cylinder, a diametral gage having a one inch diameter will be formed with the above mentioned size base ring.

It is understandable that gages formed by the above method may have different outputs in the electrical circuit therefore the gage may be calibrated by use of a spindle or pin having different diameter areas. The spindle or pin may be formed into steps of different diameter such that the gage can be placed over the spindle and calibrated at the different diameter portions along the spindle. Thus, the gage may be matched with a particular diameter compression test element which is to be tested by a particular gage.

Diametral gages made according to the teaching of the present invention provides a gage which is compact enough to fit inside a compression subassembly. Its frequency response is high enough for dynamic comparison tests to strain rates approaching 100 sec.$^{-1}$. Such diametral gages may be used in a cryogenic temperature bath as well as many other desired uses. Since the gage is formed with two pairs of diametrically opposite lobes the diametral expansion at 4 points cancels the effects of the anistropic expansion. Such gages are relatively inexpensive to form and equip with strain transducers and it allows a sample compression test to yield data of a quality previously attainable only with tensile specimens.

In order to make use of the diametral gage in testing a compression test element. The test element is placed with the diametral gage within the center portion with the four fingers in contact therewith. The gage with the specimen is placed within the anvil plunger with the lobes properly positioned relative to the pie shape feet on the anvil as shown in FIG. 1. The electrical connections are then connected into the Wheatstone bridge circuit and to a suitable electrical input thereto. The compression load is then applied to the compression specimen which applies a compression force on the compression specimen forcing the straight section of the diametral gage outwardly. Upon forcing the straight sections of the diametral gage outwardly the lobes are stressed at the same time thereby causing an imbalance in the bridge of strain gages applied to the lobes. Instrumentation of any suitable type then records the output in accordance with the strain on the strain gages the result of which indicates the diametral expansion of the compression specimen.

What is claimed and desired to be secured by Letters Patent of the United States is:

1. In a gage for measuring the diametral strain on a compression sample; which comprises:
   a metal base including at least four lobe sections,
   each of said lobe sections including an outer surface section and inwardly extending sections with the inwardly extending sections of adjacent lobe sections connected by a short section and the outer most surface of each of said lobes lying on an included circle coaxial with said base,
   each of said short connecting sections being tangent to a circle coaxial with said base with the circle having a diameter slightly less than the diameter of a compression sample to be tested, and
   at least one resistance strain gage element secured on each of said lobe sections with the center of each resistance strain gage element equiangularly spaced and lying on a radial line from the axis of said base.

2. In a gage as claimed in claim 1; wherein, said metal base is formed from a thin cylindrical member.

3. In a gage as claimed in claim 1, in which each of said resistance strain gages are connected electrically to form the arms of a Wheatstone bridge.

4. In a gage as claimed in claim 1; wherein, each of said lobe sections have a resistance strain gage secured to each of the inner and outer surface of the lobe.

5. In a gage as claimed in claim 1; wherein, each of said lobe sections extending inwardly are substantially straight elongated sections.

6. In a gage as claimed in claim 1; in which, said resistance strain gages are mounted on the inner and outer surface of alternate lobe sections.

References Cited

UNITED STATES PATENTS 2,423,867    7/1947    Zener et al. _____ 73—88.5

CHARLES A. RUEHL, Primary Examiner

U.S. Cl. X.R.

73—94